United States Patent [19]

Lee et al.

[11] Patent Number: 5,224,100
[45] Date of Patent: Jun. 29, 1993

[54] ROUTING TECHNIQUE FOR A HIERARCHICAL INTERPROCESSOR-COMMUNICATION NETWORK BETWEEN MASSIVELY-PARALLEL PROCESSORS

[75] Inventors: Sue-Kyoung Lee, Cambridge, Mass.; Danny Chin, Mercer, N.J.

[73] Assignee: David Sarnoff Research Center, Inc., Princeton, N.J.

[21] Appl. No.: 697,556

[22] Filed: May 9, 1991

[51] Int. Cl.$^5$ .............................................. H04J 3/24
[52] U.S. Cl. .................... 370/94.3; 370/94.1; 340/825.02
[58] Field of Search .................. 370/94.3, 94.1, 60; 340/825.02, 825.01, 825.52; 395/163–166; 371/8.1, 16.3, 68.1

[56] References Cited

U.S. PATENT DOCUMENTS

| | | | |
|---|---|---|---|
| 4,736,363 | 4/1988 | Aubin et al. | 370/60 |
| 4,740,954 | 4/1988 | Cotton et al. | 370/60 |
| 4,809,362 | 2/1989 | Claus et al. | 370/94.3 |
| 4,866,668 | 9/1989 | Edmonds et al. | 370/94.3 |
| 5,018,133 | 5/1991 | Tsukakoshi et al. | 370/94.3 |
| 5,088,091 | 2/1992 | Schroeder et al. | 370/94.3 |
| 5,105,424 | 4/1992 | Flaig et al. | 370/94.3 |
| 5,109,379 | 4/1992 | Kume et al. | 370/94.3 |
| 5,117,430 | 5/1992 | Berglund | 370/94.3 |
| 5,125,076 | 6/1992 | Faber et al. | 370/94.3 |

OTHER PUBLICATIONS

Chin D. et al., "The Princeton Engine: A Real Tim Video System Simulator": IEEE Transaction on Consumer Electronics, vol. 34, No. 2, May 1988.
Alverson, R. et al., "The Tera Computer System," ACM, 1990.
Wu, S. and Liu, M., "A Cluster Structure as an Interconnection Network for Large Multimicrocomputer Systems," IEEE Transactions on Computers, vol. C30 No. 4, Apr., 1981.
Vranesic, Z. et al., "Hector: A Hierarchically Structure Shared-Memory Multiprocessor", Computer, 1991.
Pitelli, F. and Smitley, D., "Analysis of a 3D Torodal Network for a Shared Memory Architecture," Proc. of Suprcomputing '88, IEEE, 1988.
Germain, C. et al., "An Interconnection Network and a Roting Scheme for a Massively Parallel Message-Passing Multicomputer" Proc. of the Symposium the Frontiers of Massively Parallel Computation, IEEE, 1990.

Primary Examiner—Douglas W. Olms
Assistant Examiner—Dang Ton
Attorney, Agent, or Firm—William J. Burke

[57] ABSTRACT

A routing process for a single-instruction-multiple-data (SIMD) multi-level hierarchical network of nodes, which are arranged in clusters and interconnected by dual, unidirectional channels, are used to send data packets including routing address information during a succession of routing cycles from transmitting ones to receiving ones of a large number of parallel processors (e.g., 4096 processors arranged in a hierarchy of 8 cabinets, each of which contains a cluster of 8 circuit boards, with each circuit board containing a cluster of 64 processors). Each of the nodes includes a storage buffer having a capacity equal to a given number which is one more than the total number of channels terminating at that node. This routing process guarantees prevention of deadlock between levels and buffer overflow, and offers high-speed, low-cost interprocessor communication for SIMD computers.

2 Claims, 4 Drawing Sheets

**4096 Processors in 8 Cabinets,
8 Boards to a Cabinet,
64 Processors to a Board**

| | 2-Dimensional Torus | Binary Hypercube | Crossbar/ Bin. Hyp. | Crossbar/ Crossbar/ Crossbar |
|---|---|---|---|---|
| Number of Bd.-to-Bd. In-Cabinet Connections | 3584 | 6144 | 96 | 288 |
| Number of Cabinet-to-Cabinet Connections | 512 | 6144 | 96 | 28 |
| Number of Total Off-Chip Connections | 8182 | 24576 | 4288 | 4412 |

FIGURE 2

ROUTING TECHNIQUE FOR A HIERARCHICAL INTERPROCESSOR-COMMUNICATION NETWORK BETWEEN MASSIVELY-PARALLEL PROCESSORS

BACKGROUND

This invention was made with government support under Contract No. MDA972-90-C-0022 awarded by the Defense Advanmced Projects Agency. The Government has certain rights in this invention.

Many types of interconnection networks for interprocessor communication (IPC) between massively-parallel computer processors are known in the art. Among these is a hierarchical type of communication network, which may be organized in a tree-like structure, in which the individual processors are situated at the lowest level (i.e., level 0) of the hierarchy and represent tree leaves. The individual processors are organized into a group of level-0 clusters, with each single processor of each individual level-0 cluster being interconnected over its own communication channel with a node for that level-0 cluster situated in level 1 of the hierarchy tree. In a similar manner, the level-1 nodes may be organized into a group of level-1 clusters, with each single node of each individual level-1 cluster being interconnected over its own communication channel with a node for that level-1 cluster situated in level 2 of the hierarchy tree. The highest level of the hierarchy tree (level n) comprises at least two interconnected nodes, which interconnect over an individual communication channel to each single one of the nodes of the (n−1) level. Each of the nodes comprises suitable network routers or switches so that any selected transmitting level-0 processor may be interconnected to any selected receiving level-0 processor, thereby providing a global IPC capability.

As is known, computers employing massively-parallel processors may take the form of either multiple-instruction, multiple-data (MIMD) machines or, alternatively, single-instruction, multiple-data (SIMD) machines. In MIMD computers, a packet in the network is from a "send" or "get" instruction that was generated independently by one of the many processors. A MIMD computer runs optimally if the average routing latency, or delay time of the packets is low. Some SIMD machines allow only one outstanding "send" at a time. All packets in the network originate from the same "send" instruction. This "send" is not complete until all packets have been delivered. Therefore, SIMD machines require a low worst-case latency for all the packets of the "send". This characteristic implies that the routing protocol for a SIMD computer does not need to prioritize packets according to their age, or time spent in the network. In addition, the network can anticipate having a limited number of packets at any time.

SIMD and MIMD interprocessor communication also differ in the expected packet size. In a MIMD system, some packets, like those containing process synchronization information, are no more than a few bytes long. Others containing data may be several kilobytes long. Packets in SIMD systems are short, often only one word long. They may contain the value of neighboring pixels or matrix coefficients.

High bandwidth interconnection networks are costly and complex to build, hence the issue of scalability is central to any design. The speed of interconnection networks is a prime factor in performance, particularly for computers that do not mask IPC delays well, such as SIMD machines. The present invention is directed to an improved routing technique for a hierarchical interprocessor-communication network of a SIMD machine that is efficient in improving the operation of the network from both low-cost and low-latency (i.e., inserts low IPC delays) points of view.

SUMMARY OF THE INVENTION

The present invention is directed to a routing process for routing a packet of data including address information in a single-instruction-multiple-data (SIMD) parallel-processor computer between any of the parallel processors of the computer and any other of the parallel processors of the computer during successive routing cycles of the computer. The parallel processors form the leaves of a hierarchical processor-interconnection tree structure having at least two hierarchical levels of nodes and a network of interconnection channels. The highest level of the hierarchical processor-interconnection tree structure includes at least two nodes with each node of a hierarchical level above the first hierarchical level of nodes being a parent node of a plurality of offspring nodes at the next lower hierarchical level. Each of the first-level nodes is individually interconnected to a separate one of the parallel processors by a channel of the network, and each offspring node is interconnected to its parent node by a channel of the network. In addition, each offspring node of a common parent node is interconnected to at least one other offspring node of that common parent node by a channel of the network, and each node of the highest hierarchical level is interconnected to at least one other node of the highest hierarchical level by a channel of the network. Further, all of the network channels are dual, unidirectional links that allow simultaneous transmission of two packets in opposite directions, and each node includes (1) a buffer having a storage capacity for storing one more packets than the total number of network channels at that level, and (2) a router for extending a connection which originated at a transmitting one of said parallel processors from that node toward a receiving one of said parallel processors over the channel network in accordance with address information contained in a packet stored in the buffer of that node.

The routing process of the present invention comprises the following steps during each of the successive routing cycles of the computer:

(a) at each parent node of the hierarchical processor-interconnection tree structure, sending down over a channel down-link to each of its offspring nodes packets stored in the buffer of that parent node that contain address information that requires that packet to be forwarded to that offspring node in order to extend a connection from a transmitting processor toward a receiving processor, until either the buffer of that parent node has one empty storage space or its offspring nodes have no packets to send up to it;

(b) in response to the buffer of a parent node having one empty storage space or its offspring nodes have no packets to send up to it, signaling its offspring nodes from that parent node that each of its offspring nodes may attempt to send up to it a packet previously stored in the buffer of that offspring node over a channel up-link that contains address information that requires that packet to be forwarded from that parent node in order to extend a connection from a transmitting processor toward a receiving processor; and (c) in case the attempt set forth in step (b) cannot be accomplished during a current routing cycle by a given one of the offspring nodes of that parent node because a packet is then being forwarded to that parent node from the buffer of another of its offspring nodes, forwarding the packet from the buffer of the given one of the offspring nodes of that parent node during that current routing cycle for storage in the buffer of some other of the offspring nodes of that parent node.

BRIEF DESCRIPTION OF THE DRAWING

FIG. 2 is a table showing the respective required number of interconnections for 4096 processors housed in 8 cabinets, with 8 circuit boards per cabinet and 64 processors per circuit board, for each of several different types of interconnection networks;

DESCRIPTION OF THE PREFERRED EMBODIMENT

Figure 1:
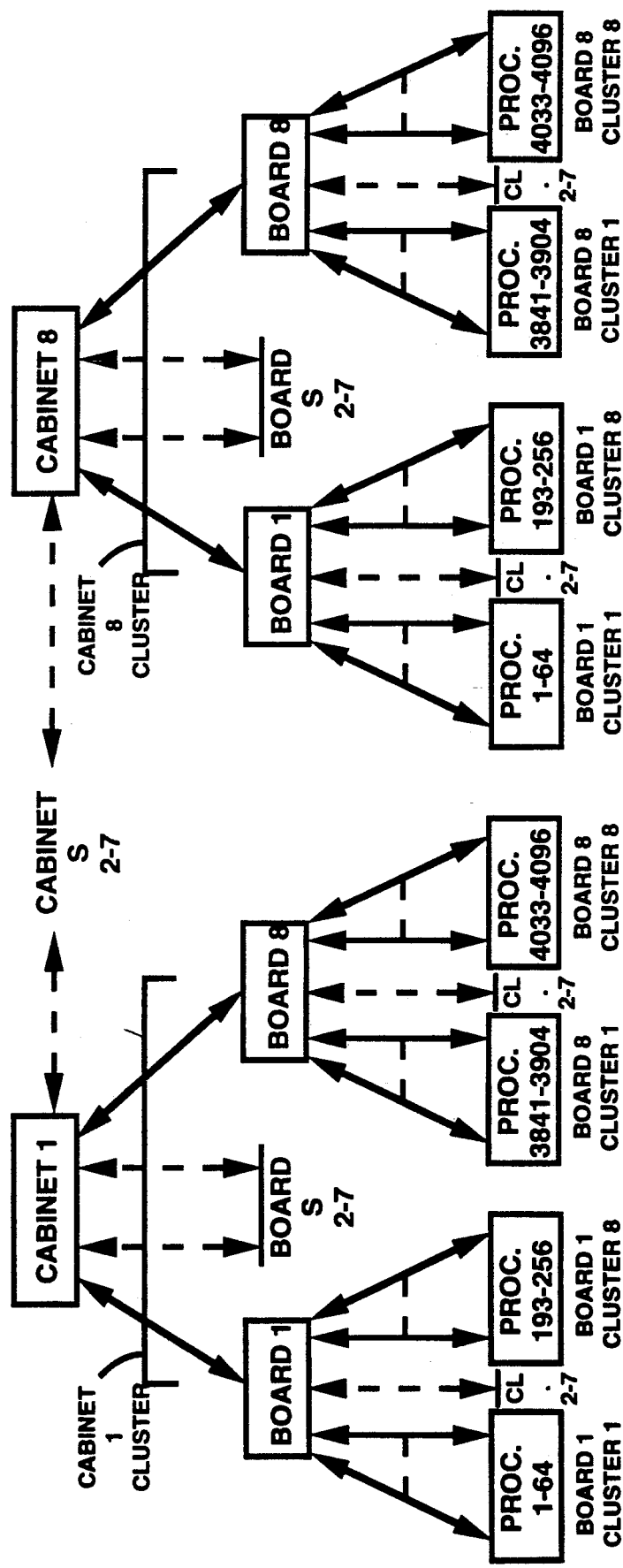
FIG. 1 is a diagrammatic showing of a hierarchical indirect network for inter-processor communication among 4096 processors.

Solely for illustrative purposes in describing the present invention, it is assumed that 4096 processors are interconnected in a hierarchical interprocessor-communication network, as shown in FIG. 1, with each cluster of 64 processors being situated on a separate one of 8 circuit boards that are housed within each separate one of 8 cabinets. Each one of the 64 processors of a cluster at level 0 of the hierarchy is interconnected to its own individual node at level 1 of the hierarchy, resulting in 64 level-1 nodes that are located in that cluster's circuit board. Each cluster of 8 of the 64 level-1 nodes of the hierarchy, corresponding to the 8 circuit boards that are housed within each separate cabinet, is interconnected to an individual node at level 2 of the hierarchy, resulting in a total of 8 level-2 nodes. All 8 level-2 nodes of the hierarchy, corresponding to the 8 separate cabinets, are interconnected to on another at level 3 of the hierarchy.

Each of the total of 64 circuit boards, in addition to including its associated cluster of 64 processors, also may include an on-board router integrated circuit comprising the individual level-1 nodes of its associated cluster. The level-2 node associated with the cluster of 8 circuit boards housed in any given one of the 8 cabinets may be implemented by a router integrated circuit located on the backplane of the cabinet with which it is associated. This leaves only the single level-3 node router, associated with the cluster of 8 cabinets, to be implemented by means not limited to just an integrated circuit.

It is desirable that the above-described hierarchical interprocessor-communication network for 4096 processors be able to support applications that require more elaborate, global communication. For example, fast fourier transforms (FFTs), raster mapping, and compiler operations like parallel data shifts all require moving data between distant processors in irregular patterns. Many applications also require support for communication where routing patterns are not known until runtime. Such needs prompted research into IPC systems that are not dependent on the processors themselves for routing control, and that can handle routing patterns with little spatial locality. Further, hierarchical networks have numerous parameters in addition to the number of network levels, such as the topology of clusters at each level. In practice, the optimal choice for these parameters is dependent on the nature or the anticipated routing patterns.

Interconnection networks for global IPC have been a topic of considerable research activity. Two major classes of interconnection networks have been proposed: direct and indirect. Examples of indirect networks are the Omega, Benes, and perfect-shuffle networks. Indirect networks have been implemented in the BBN Butterfly and the IBM RP3. Direct, or static networks use a variety of topologies such as the ring, the two-dimensional mesh or torus, the direct k-ary, n-cube, an example of which is the hypercube, and the complete-connection, or crossbar. The Tera Computing System, iWarp, and Cosmic Cube use the 2-dimensional torus. A 12-dimensional hypercube is implemented in the Connection Machine.

Central to descriptions and discussions of each of these interconnection networks is the cost of network implementation and the function that cost plays with performance. Cost may be measured in controller complexity, length of connections, or number of connections. For large SIMD systems, the number of connections is the critical cost as the system grows to many thousand processors and spans multiple boards and cabinets. Limiting the number of connections, or cost, may limit system performance.

Hierarchical networks (which, in themselves, are not novel) offer one solution to the cost-performance tradeoff problem. By way of examples, hierarchical networks have been implemented, in the past, in the Hector, Cm*, and Cedar systems. With the steady growth and maturity of massively-parallel systems, hierarchical networks hold special promise for high-speed communication.

Referring again to FIG. 1, there is shown a functional block diagram of the assumed 4096-processor hierarchical network, discussed above. As shown in FIG. 1, this hierarchical network has a tree-like structure. Tree leaves are processors and inner nodes are network routers or switches. A group of nodes having a common parent is called a cluster, with each node of a cluster being called an offspring of its common parent. All clusters within a tree level are interconnected with the same topology, but different tree levels may have different topologies, such as 2-dimensional tori, hypercubes or crossbars, as the case may be.

The number of network levels and the sizes and topologies of clusters have a profound effect on both the hardware complexity and the network performance. These parameters should be selected to minimize the quantity of off-chip hardware, such as board-to-board or cabinet-to-cabinet connections. These connections are more expensive and slower than in-board and in-chip connections and, hence, should be avoided.

In this regard, FIG. 2 comprises a table which shows the differences in off-chip hardware costs for the above-described 4096-processor interconnection network, in which it is assumed that the complete computer is housed in 8 cabinets, with 8 boards per cabinet, and 64 processors per board, is dependent on the particular topology employed. The topologies examined are a binary hypercube, a two-dimensional torus, and two hierarchical networks. The choice of cluster sizes for the hierarchical networks corresponds directly to the hardware layout indicated earlier. Each bottom level cluster interconnects the 64 processors of a board using a router implemented in a single IC. The second level clusters interconnect the 8 boards of a common cabinet and the single cluster of the third level interconnects all 8 cabinets.

FIG. 2 shows that the hierarchical topologies have a considerably lower number of connections than the single level topologies. Particularly significant are the hierarchical network's savings in the number of cabinet-to-cabinet connections.

Before presenting the novel routing technique of the present invention for an SIMD hierarchical network, it is worthwhile pointing out several characteristics of IPC in SIMD computers exploited by this routing technique. In this routing technique, packets are routed from the transmitting processor to the receiving processor by a series of "hops" through intermediate nodes. The packets are buffered between "hops" at each node. The "hops" constitute the path of the packet through the network. This path is generated using a traditional, tree-traversal algorithm. A packet moves up to the lowest possible cluster necessary to reach its destination, traverses the cluster, and then moves down to its destination processor.

In addition, a version of forced, or desperation, routing known in the art is used for cluster traversal. Each cluster node has a buffer space for each of its in-cluster channels. At each routing cycle, every packet is sent out on one of these channels, leaving the buffer empty of "old" packets. Each packet vies with the others to be transmitted on a channel that it needs. If a packet cannot get a channel it needs, it is forcibly routed on an unused in-cluster channel. A packet may arrive on each in-cluster channel during a cycle, hence the maximum number of incoming packets equals the number of channels, or equivalently, the node's buffer space. There is no possibility of buffer overflow.

Forced routing is effective for topologies where a large number of paths, perhaps varying in length, exists between each pair of nodes, like a crossbar or hypercube. In such cases, a packet waiting in line for a particular channel may progress faster by taking a longer path. In the case of a crossbar, a packet's path to its destination does not become any longer if it is forcibly routed. By using alternate paths, forced routing alleviates hot-spot traffic congestions, thus lowering routing times.

Figure 3:
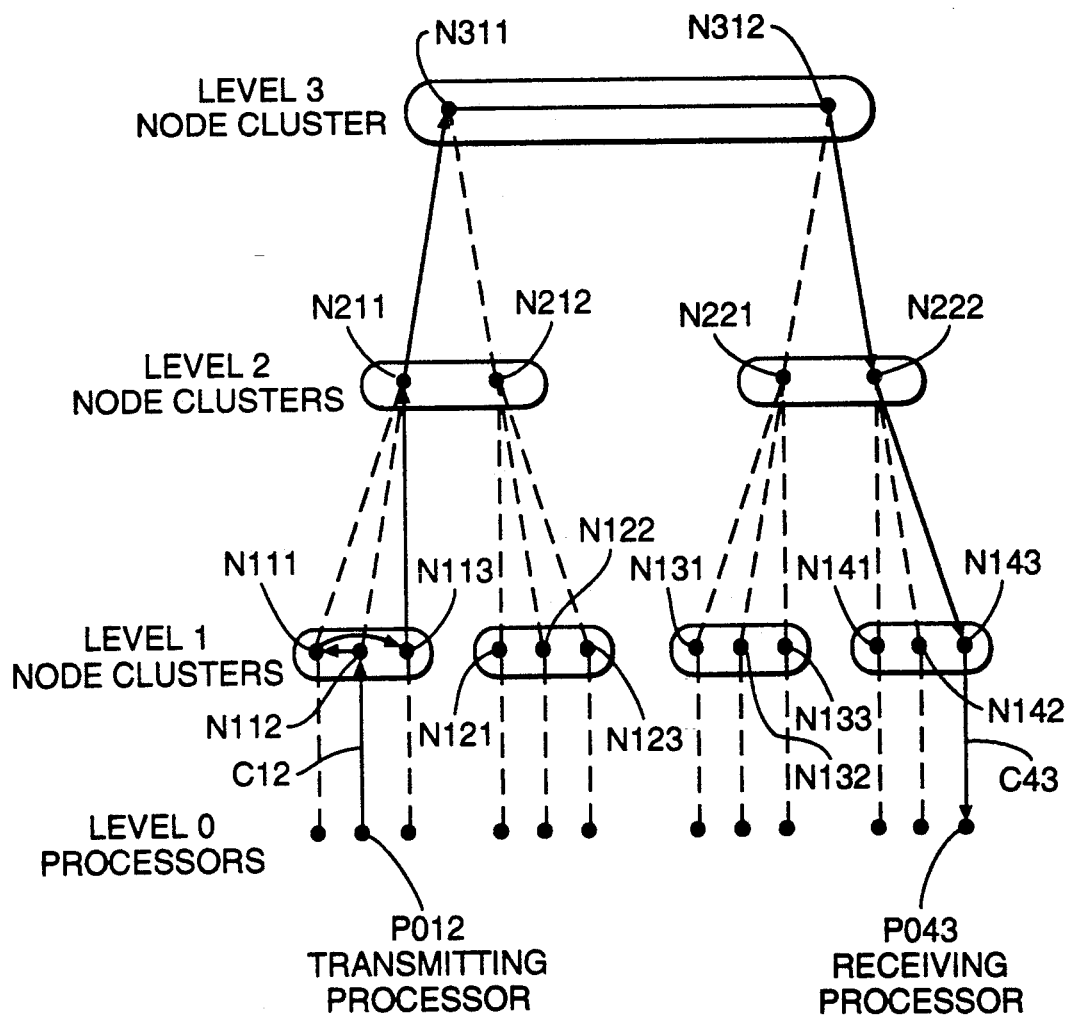
FIG. 3 is a simplified functional diagram illustrating the routing technique of the present invention.

Reference is now made to FIG. 3, which is a simplified diagram of the type of routing paths employed by the routing technique of the present invention. For illustrative purposes, a three-level hierarchical structure is assumed in FIG. 3, wherein level 3 comprises cluster modes N311 and N312. Level 2 includes cluster nodes N211 and N212, which are the offspring of parent node N311, and cluster nodes N221 and N222, which are the offspring of parent node N312. Level 1 includes cluster nodes N111, N112 and N113, which are the offspring of parent node N211; cluster nodes N121, N122 and N123, which are the offspring of parent node N212; cluster nodes N131, N132 and N113, which are the offspring of parent node N221; and cluster nodes N141, N142 and N143, which are the offspring of parent node N222.

As indicated in FIG. 3, each of the level-1 nodes is interconnected through an individual dedicated channel to a corresponding one of the level 0 processors. In particular, processor P012 is interconnected to node N112 through its own dedicated channel C12 and processor P043 is interconnected to node N143 through its own dedicated channel channel C43. Further, as indicated in FIG. 3, network channels, that are allotted to a routed data packet, interconnect to one another all those cluster nodes of the same level which are offspring of a common parent node at the next higher level, as well as interconnecting each of these offspring nodes to its common parent node.

Figure 4:
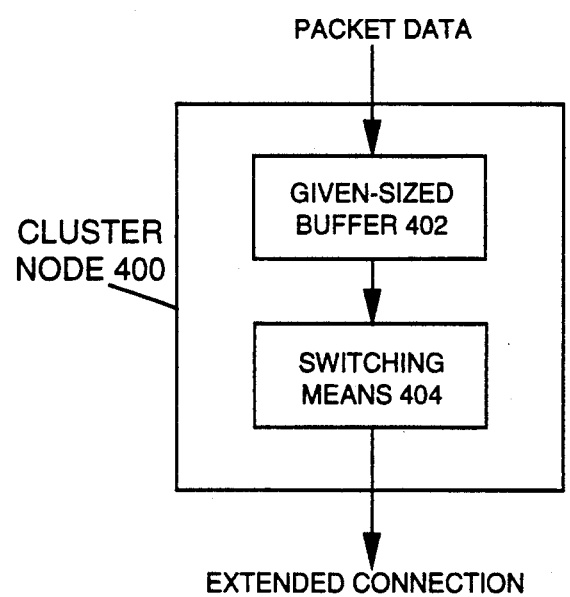
FIG. 4 is a functional block diagram of means included in each one of the cluster nodes shown in FIG. 3.

The hierarchical structure shown in FIG. 3 assumes that all network channels are dual, unidirectional links, allowing simultaneous transmission of two packets in opposite directions. It also assumes that each link, whether within a cluster or between levels, can deliver exactly one packet per computer machine cycle. Further, as shown in FIG. 4, each cluster node 400 includes a given-sized buffer 402 for storing packet data (including routing address information) and suitable switching means 404 controlled by the routing address information during each computer machine cycle for the purpose of extending a connection through a channel during that computer machine cycle.

In the following description of the routing technique of the present invention, "noChans" designates the total number of channels interconnecting the node of a given cluster at a given hierarchical level to another cluster node at a hierarchical level immediately above or below the given hierarchical level, or, in the case of level 1, to an individual processor in level 0. The size of each buffer is equal to "noChans +1".

In accordance with the routing technique of the present invention, at each cluster node, during each routing cycle, the following process steps take place for extending a connection from a sending processor toward a receiving processor identified by the routing address information:

(1) For each parent node of each cluster, there is sent down over a channel down-link to each of its offspring nodes packets stored in the buffer of that parent node that contain address information that requires that packet to be forwarded to that offspring node in order to extend a connection from a transmitting processor toward a receiving processor, until either the buffer of that parent node has one empty storage space or its offspring nodes have no packets to send up to it.

(2) Whenever the buffer of a parent node has one empty storage space or its offspring nodes have no packets to send up to it, the parent node signals its offspring nodes that each of its offspring nodes may attempt to send up to it an "old" packet (i.e., a packet that was stored in the buffer of that offspring node prior to the beginning of the current routing cycle) over a channel up-link that contains address information that requires that packet to be forwarded from that parent node in order to extend a connection from a transmitting processor toward a receiving processor.

(3) In those cases in which the attempt set forth in step (2) cannot be accomplished during the current routing cycle by a given one of the offspring nodes of that parent node because a packet is then being forwarded to that parent node from the buffer of another of its offspring nodes, the packet from the buffer of the given one of the offspring nodes of that parent node during the current routing cycle is forwarded for storage in the buffer of some other of the offspring nodes of that parent node (i.e., forced or desperation routing is resorted to in these cases).

Returning to FIG. 3, it is assumed that transmitting processor P012 is to be interconnected to receiving processor P043 over the interconnection channels shown in FIG. 3 by solid lines, while one or more other transmitting processors may be seeking interconnection to one or more other receiving processors over interconnection channels shown in FIG. 3 by dashed lines. During a first routing cycle, a given packet including data for use by receiving processor P043 together with required routing address information is moved up to node N112 over the interconnecting dedicated channel C12 therebetween and stored within its buffer. Assuming that during the second routing cycle, its parent node N211 is not free for some reason to allot the channel to it from its offspring node N112, such as because the buffer of parent node 211 is then completely full or the router of parent node 211 is then busy with another packet, forced routing is employed for transferring the given packet from the buffer of node N112 to the buffer of node N111. Again, forced routing is assumed to be required during the third routing cycle, and the given packet from the buffer of node N111 is transferred to the buffer of node N113. However, on the fourth routing cycle, parent node N211 finally allots the channel interconnecting it to offspring node N113, and the given packet is moved up and stored in the buffer of node N211. In a similar manner, the packet is successively moved up from offspring node N211 to its parent node N311, across to node N312, and then down through offspring node N222 of parent node N312 and offspring node N143 of parent node N222 during the respective fifth to eighth routing cycles, and finally to receiving processor P043 over dedicated channel C43 during the ninth routing cycle.

In the above-described routing process, upward movement needs explicit flow control. Each packet that wants to move up must wait until its parent has unoccupied buffer space. On the other hand, downward movement requires no flow control. A packet that wants to move down is not allowed to go only if another packet at that node is given rights for the channel. This restriction of downward movement is called downward blockage. All packets that want to traverse a cluster at a given level or are waiting to move up to a higher level or down to a lower level are routed using forced routing.

Thus, the above-described routing process guarantees prevention of deadlock between levels and buffer overflow. A level is always allowed to send a fixed number of packets to lower levels. Packets in a level are hence never completely trapped. When they leave, they make space for packets from lower levels to move up.

Buffer overflow is guaranteed against, provided that each node buffer has space for noChans+1 packets. The forced routing protocol used within a cluster guarantees that packets moving within the cluster will not consume more than noChans buffer spaces. An extra space is reserved in case a packet moves down from the next higher level. Its downward movement during the next routing cycle is impaired only if it is blocked by another packet from the cluster. If the packet is blocked, then it can take the buffer place of the packet that impaired it. In either case, the special buffer space is always empty at the end of the cycle. Therefore, packets traversing the cluster and moving downward never cause buffer overflow.

Further, this above-described routing process reduces hardware complexity by almost eliminating the number of flow control lines. It tries to minimize the total routing latency time by maximizing the number of packets present in the network at any time. By keeping the buffers as full as possible, a large number of packets will make progress. Such a strategy backfires only if cluster nodes contain few redundant paths. In this case, if a large amount of forced (desperation) routing occurs, then the amount of forward progress will not necessarily exceed the progress lost by such forced routing.

From the foregoing, it is evident that a cost-effective network can be found for a system if the amount of locality in the routing permutation is known. For some routing permutations and levels, a topology with a high peak bandwidth and a correspondingly high hardware cost may not provide better performance than an economic, slower topology. For a three-level hierarchy, a ring (toroid) topology structure for level 1, and a crossbar topology structure for each of levels 2 and 3 performs almost comparably to a crossbar topology structure for all of levels 1, 2 and 3, but yet is significantly easier to implement. In those cases in which the expected routing patterns are generally global in nature, then the highest topology should be one with a high degree of connectivity, such as a crossbar. The lower topologies do not influence performance significantly, so a ring, binary hypercube and crossbar topology structure for respective hierarchical levels 1, 2 and 3 would be a good candidate.

Hierarchical networks employing the above-described routing process can offer high-speed, low-cost interprocessor communication for SIMD computers. Simulations show that when the hierarchical network is tailored for the hardware, the cost-latency products are comparable to, and sometimes lower than some single level topologies.

Once the network structure is determined, cluster topologies must be chosen so that each level's actual throughput is balanced with its traffic load. With a proper balance, the network's channels operate at a high utilization rate, ensuring that network performance justifies network cost.

What is claimed is:

1. In a single-instruction-multiple-data (SIMD) computer comprising parallel processors: a routing process, including successive routing cycles, for routing a packet of data including address information between any of the parallel processors of said computer and any other of the parallel processors of said computer during said successive routing cycles of said computer; wherein said parallel processors form the leaves of a hierarchical processor-interconnection tree structure having at least two hierarchical levels of nodes and a network of interconnection channels; wherein said highest level of said hierarchical processor-interconnection tree structure includes at least two nodes with each node of a hierarchical level above the first hierarchical level of nodes being a parent node of a plurality of offspring nodes at the next lower hierarchical level; wherein each of said first-level nodes is individually interconnected to a separate one of said parallel processors by a channel of said network, each offspring node is interconnected to its parent node by a channel of said network, each offspring node of a common parent node is interconnected to at least one other offspring node of that common parent node by a channel of said network, and each node of the highest hierarchical level is interconnected to at least one other node of the highest hierarchical level by a channel of said network; wherein each of said network channels comprises dual, unidirectional links that allow simultaneous transmission of each of two data packets in opposite directions over that network channel; and wherein each node includes (1) a buffer having a storage capacity for storing a given number of data packets which given number is one more than the total number of network channels terminating at that node, and (2) a router extending a connection which originated at a transmitting one of said parallel processors from that node toward a receiving one of said parallel processors over said channel network in accordance with address information contained in a data packet stored in the buffer of that node; said routing process comprising the steps during each of said successive routing cycles of said computer of:

(a) at each parent node of the hierarchical processor-interconnection tree structure, sending down over a channel down-link to each of its offspring nodes data packets stored in the buffer of that parent node that contain address information that requires that data packet to be forwarded to that offspring node in order to extend a connection from a transmitting processor toward a receiving processor, until either the buffer of that parent node has one empty storage space or its offspring nodes have no packets to send up to it;

(b) in response to the buffer of a parent node having one empty storage space or its offspring nodes have no data packets to send up to it, signaling its offspring nodes from that parent node that each of its offspring nodes may attempt to send up to it a data packet previously stored in the buffer of that offspring node over a channel up-link that contains address information that requires that data packet to be forwarded from that parent node in order to extend a connection from transmitting processor toward a receiving processor; and (c) in case the attempt set forth in step (b) cannot be accomplished during a current routing cycle by a given one of said offspring nodes of that parent node because a data packet is then being forwarded to that parent node from the buffer of another of its offspring nodes, forwarding the data packet from the buffer of said given one of said offspring nodes of that parent node during that current routing cycle for storage in the buffer of some other of said offspring nodes of that parent node.

2. In a single-instruction-multiple-data (SIMD) computer comprising massively parallel processors; a routing process, including successive routing cycles, for routing a packet of data including address information between any of the massively parallel processors of said computer and any other of the massively parallel processors of said computer during said successive routing cycles of said computer; wherein said computer comprises 4096 parallel processors that form the leaves of a hierarchical processor-interconnection tree structure having three hierarchical levels of nodes and a network of interconnection channels; wherein said third level of said hierarchical processor-interconnection tree structure includes eight nodes with each of said eight nodes of said third hierarchical level being a parent node of a cluster of eight offspring nodes at the second hierarchical level, and each of said cluster of eight offspring nodes of the second hierarchical level being a parent node of a cluster of sixty-four offspring nodes at the first hierarchical level; wherein each of said first-level nodes is individually interconnected to a separate one of said 4096 parallel processors by a channel of said network, each cluster offspring node at the first hierarchical level is interconnected to its parent node at the second hierarchical level by a channel of said network, each cluster offspring node at the second hierarchical level is interconnected to its parent node at the third hierarchical level by a channel of said network, and each of the nodes of the third hierarchical level is interconnected to another node of the third hierarchical level by a channel of said network; wherein each of said network channels comprises dual, unidirectional links that allow simultaneous transmission of each of two data packets in opposite directions over that network channel; and wherein each node includes (1) a buffer having a storage capacity for storing a given number of data packets which given number is one more than the total number of network channels terminating at that node, and (2) a router for extending a connection which originated at a transmitting one of said parallel processors from that node toward a receiving one of said parallel processors over said channel network in accordance with address information contained in a data packet stored in the buffer of that node; said routing process comprising the steps during each of said successive routing cycles of said computer of:

(a) at each parent node of the hierarchical processor-interconnection tree structure, sending down over a channel down-link to each of its offspring nodes data packets stored in the buffer of that parent node that contain address information that requires that data packet to be forwarded to that offspring node in order to extend a connection from a transmitting processor toward a receiving processor, until either the buffer of that parent node has one empty storage space or its offspring nodes have no packets to send up to it;

(b) in response to the buffer of a parent node having one empty storage space or its offspring nodes have no data packets to send up to it, signaling its offspring nodes from that parent node that each of its offspring nodes may attempt to send up to it a data packet previously stored in the buffer of that offspring node over a channel up-link that contains address information that requires that data packet to be forwarded from that parent node in order to extend a connection from a transmitting processor toward a receiving processor; and (c) in case the attempt set forth in step (b) cannot be accomplished during a current routing cycle by a given one of said offspring nodes of that parent node because a data packet is then being forwarded to that parent node from the buffer of another of its offspring nodes, forwarding the data packet from the buffer of said given one of said offspring nodes of that parent node during that current routing cycle for storage in the buffer of some other of said offspring nodes of that parent node.

* * * * *